(12) United States Patent
Zha et al.

(10) Patent No.: US 8,488,603 B2
(45) Date of Patent: Jul. 16, 2013

(54) METHOD, APPARATUS, AND SYSTEM FOR IMPLEMENTING MULTICAST SERVICES

(75) Inventors: Min Zha, Shenzhen (CN); Yong Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 489 days.

(21) Appl. No.: 12/704,579

(22) Filed: Feb. 12, 2010

(65) Prior Publication Data

US 2010/0142530 A1    Jun. 10, 2010

Related U.S. Application Data

(63) Continuation of application No. PCT/CN2008/072006, filed on Aug. 15, 2008.

(30) Foreign Application Priority Data

Aug. 15, 2007    (CN) .......................... 2007 1 0140580

(51) Int. Cl.
*H04L 12/56* (2006.01)
(52) U.S. Cl.
USPC .......................................... 370/390; 370/432
(58) Field of Classification Search
None
See application file for complete search history.

(56) References Cited

U.S. PATENT DOCUMENTS

| | | | |
|---|---|---|---|
| 6,181,697 B1 | 1/2001 | Nurenberg | |
| 6,831,917 B1 * | 12/2004 | Cheriton | 370/392 |
| 7,080,157 B2 * | 7/2006 | McCanne | 709/238 |
| 7,570,605 B1 * | 8/2009 | Aggarwal et al. | 370/256 |
| 7,616,634 B2 * | 11/2009 | Gotoh et al. | 370/390 |
| 2005/0025143 A1 * | 2/2005 | Chen et al. | 370/389 |
| 2005/0190765 A1 | 9/2005 | Gotoh et al. | |
| 2005/0195816 A1 * | 9/2005 | Sumiyoshi | 370/390 |
| 2006/0109807 A1 | 5/2006 | Lee | |

(Continued)

FOREIGN PATENT DOCUMENTS

| | | |
|---|---|---|
| CN | 1713611 A | 12/2005 |
| CN | 1744574 A | 3/2006 |

(Continued)

OTHER PUBLICATIONS

Second Office Action of corresponding Chinese Patent Application No. 200710140580.4, mailed on Mar. 2, 2011, 35 pages total.
Search report issued in corresponding European patent application No. 08783997.3, Jun. 9, 2010, 6 pages.
Office action issued in corresponding Chinese patent application No. 2007101405804, Aug. 12, 2010, 30 pages.

(Continued)

*Primary Examiner* — Hassan Phillips
*Assistant Examiner* — Duc Duong
(74) *Attorney, Agent, or Firm* — Brinks Hofer Gilson & Lione

(57) ABSTRACT

A method, device and system for implementing the multicast service are provided, and the method comprises: at the ingress node and exit node of the multicast path, establishing the mapping relationship information between the original multicast address identifier of the multicast service data and the multicast address identifier inside the bearer network; when the multicast source sends the multicast service data, the ingress node maps the original multicast address identifier of the multicast service data to the multicast address identifier inside the bearer network according to the mapping relationship information, and sends the multicast service data to the exit node along the multicast path; and the exit node maps the multicast identifier of the multicast service data inside the bearer network to the original multicast address identifier according to the mapping relationship information, and sends it to the receiving side of the multicast service data.

4 Claims, 6 Drawing Sheets

U.S. PATENT DOCUMENTS

2008/0046946 A1* 2/2008 Diroo et al. ............ 725/112
2008/0130661 A1* 6/2008 Jiang et al. ............ 370/401
2009/0003341 A1* 1/2009 Brown et al. .......... 370/389

FOREIGN PATENT DOCUMENTS

| CN | 1968183 A | 5/2007 |
|---|---|---|
| EP | 1950907 A1 | 7/2008 |
| EP | 1134933 A2 | 9/2009 |

OTHER PUBLICATIONS

Written opinion issued in corresponding PCT application No. PCT/CN2008/072006, Nov. 12, 2008, 4 pages.

Office Action issued in corresponding European Patent Application No. 08783997.3, mailed Jan. 3, 2013.

* cited by examiner

METHOD, APPARATUS, AND SYSTEM FOR IMPLEMENTING MULTICAST SERVICES

CROSS-REFERENCE TO RELATED APPLICATION

The application is a continuation of International Application No. PCT/CN2008/072006, filed on Aug. 15, 2008, which claims priority to Chinese Patent Application No. 200710140580.4, filed on Aug. 15, 2007, both of which are hereby incorporated by reference in their entireties.

FIELD OF THE INVENTION

The present invention relates to a multicast technology in the communication field, and in particular, to a method, device, and system for implementing multicast services.

BACKGROUND OF THE INVENTION

On the Internet, multimedia services such as streaming, videoconferencing, and Video On Demand (VOD) are becoming important components in information transmission. Unicast, which is a point-to-point transmission mode, cannot adapt to transmission features of multimedia services, namely, single-point transmission and multi-point reception. In this case, multicast emerges. Multicast is a method for a host to send a message to multiple specific recipients, and becomes an indispensable key technology on the new generation network.

The basic conception of the Internet Protocol (IP, a network interconnection protocol) multicast is: A source host sends only one copy of data, and the destination address in the data is the address of a multicast group. All recipients in the multicast group can receive the same copy of data, and only a host (destination host) in the multicast group can receive the data, and other hosts on the network cannot receive it. IP addresses are categorized into four classes, namely, classes A-D. Class D addresses are reserved as multicast addresses. In IPv4, all IP addresses from 224.0.0.0 to 239.255.255.255 are class D addresses. Addresses from 224.0.0.0 to 224.0.0.255 are reserved. Addresses from 224.0.1.0 to 238.255.255.255 are multicast addresses for users and are valid on the entire network. Addresses from 239.0.0.0 to 239.255.255.255 are administratively scoped multicast addresses and are valid in the specific local scope. On an IPv4 multicast network, how to use addresses other than known and reserved multicast addresses is not specified. Therefore, addresses may conflict.

Most Internet Protocol Television (IPTV) services are developed using multicast technologies. In the IPTV operation in a prior art, multiple IPTV operators may share one bearer network, as shown in FIG. 1. In the scenario, a User Equipment (UE) obtains the multicast address of a channel from an Electronic Program Guide (EPG) provided by an IPTV operator, and then initiates a multicast request according to the multicast address.

Multicast addresses provided by different IPTV operators may be the same, and multicast paths of most programs of one IPTV operator may also be the same. Therefore, a conflict may occur. To solve the conflict problem, channels of each IPTV operator may be allocated different multicast addresses. If each channel requires one IP multicast address, the bearer network needs to maintain many multicast paths. Thus, the maintenance burden is very heavy.

In a prior art that enables a network operator to manage multicast addresses in a unified manner, the network operator allocates multicast addresses to channels of an IPTV operator and provides an EPG in a unified manner, thus ensuring that multicast addresses on the bearer network do not conflict. To a certain degree, the solution solves the possible multicast address conflict problem when multiple IPTV operators share one bearer network.

During the process of implementing the present invention, the inventor finds that the prior art has at least the following weakness:

If multicast addresses of channels of an IPTV operator are allocated by a network operator, multicast addresses of channels of the IPTV operator can hardly be consistent when the network of the IPTV operator needs to be connected to multiple bearer networks. The bearer network still needs to maintain many multicast paths.

SUMMARY OF THE INVENTION

Embodiments of the present invention provide a method, device, and system for implementing multicast services to reduce the number of multicast paths to be maintained by the bearer network.

A method for implementing multicast services includes:
  setting up a mapping relationship information between an original multicast address ID of multicast service data and a multicast address ID inside a bearer network at an ingress node and an egress node of a multicast path; and
  by the ingress node, converting the address of the received multicast service data from the original multicast address ID into the multicast address ID inside the bearer network according to the mapping relationship information and sending out the multicast service data; and by the egress node, converting the address of the received multicast service data from the multicast address ID inside the bearer network into the original multicast address ID according to the mapping information and sending out the multicast service data.

A multicast address management entity includes:
  a multicast address mapping module (61), configured to set up a mapping relationship information between an original multicast address ID of multicast service data and a multicast address ID inside a bearer network; and
  a multicast address mapping sending module (62), configured to send the mapping between the original multicast address ID and the multicast address ID inside the bearer network to an ingress node device and an egress node device of a multicast path.

A data transmission device includes an external interface module and an internal interface module, which are configured to exchange multicast service data with an external device and an internal device on the bearer network respectively. The data transmission device further includes:
  a multicast address mapping receiving module, configured to receive a mapping of multicast addresses, which is the mapping between an original multicast address ID of multicast service data and a multicast address ID inside the bearer network; and
  a multicast address mapping module, configured to convert the original multicast address ID of the multicast service data into the multicast address ID inside the bearer network according to the mapping information and send the multicast service data to the internal interface module; or convert the multicast address ID inside the bearer network into the original multicast address ID of the multicast service data according to the mapping information and send the multicast service data to the external interface module.

A system for implementing multicast services includes a multicast address management entity and two or more data transmission devices.

The multicast address management entity is adapted to: set up a mapping between an original multicast address ID of multicast service data and a multicast address ID inside the bearer network, and send the mapping information to the data transmission device located at the ingress and the data transmission device located at the egress of a multicast path respectively.

The data transmission device at the ingress of the multicast path is configured to convert the original multicast address ID of the received multicast service data into the multicast address ID inside the bearer network according to the mapping, and send the multicast service data.

The data transmission device at the egress of the multicast path is configured to convert the multicast address ID inside the bearer network into the original multicast address ID of the multicast service data according to the mapping relationship information, and send the multicast service data.

A computer-readable storage medium stores a readable and writable program, which enables a computer to execute the following method:

setting up a mapping between an original multicast address ID of multicast service data and a multicast address ID inside the bearer network on an ingress node and an egress node of a multicast path;

by the ingress node, converting the address of the received multicast service data from the original multicast address ID into the multicast address ID inside the bearer network according to the mapping information and sending out the multicast service data; and by the egress node, converting the address of the received multicast service data from the multicast address ID inside the bearer network into the original multicast address ID according to the mapping information and sending out the multicast service data.

In embodiments of the present invention, an original multicast address ID of multicast service data is mapped to a multicast address ID inside the bearer network, and the multicast service data is sent to an ingress node and an egress node of a multicast path. Thus, during transmission of the multicast service data, through an address mapping at the ingress node and the egress node, the multicast address ID inside the bearer network is used when the multicast service data is transmitted inside the bearer network and the original multicast address ID is used when the multicast service data is transmitted outside the bearer network. Therefore, internal multicast addresses of the bearer network do not conflict. In addition, a proper address mapping can be used to reduce the number of multicast paths to be maintained on the bearer network.

DETAILED DESCRIPTION OF THE INVENTION

In embodiments of the present invention, the control and data processes of a UE and an IPTV operator do not change. The bearer control layer and the bearer layer convert multicast addresses in control and data streams. Multicast addresses allocated by the IPTV operator are still used outside the multicast service bearer network, and internal multicast addresses of the bearer network allocated by the bearer control layer and the bearer layer are used inside the multicast service bearer network for transmitting multicast services. Thus, a conflict of multicast addresses inside the bearer network is avoided.

The present invention is hereinafter described in detail with reference to several exemplary embodiments and the accompanying drawings.

Figure 1:
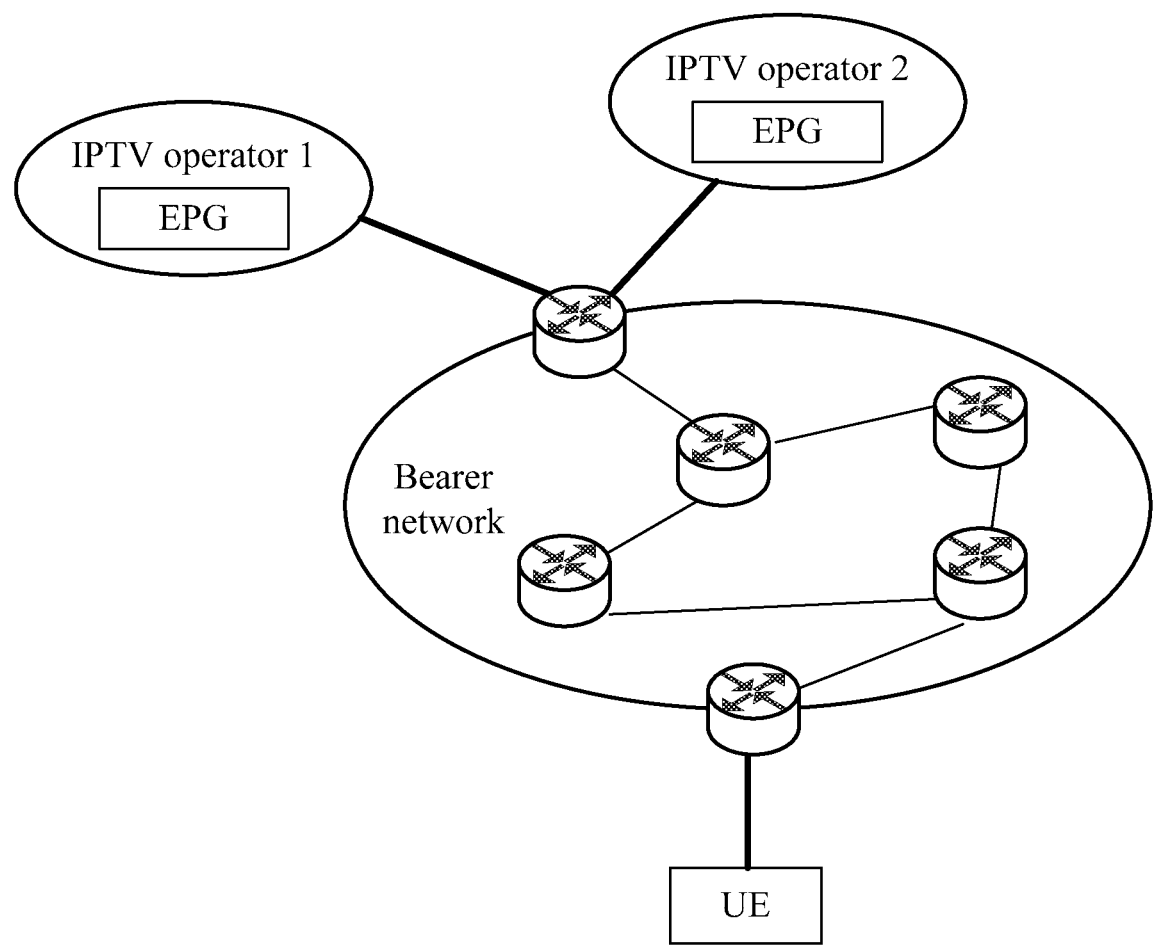
FIG. 1 is a schematic diagram illustrating the sharing of one bearer network among multiple IPTV operators in a prior art.
Figure 2:
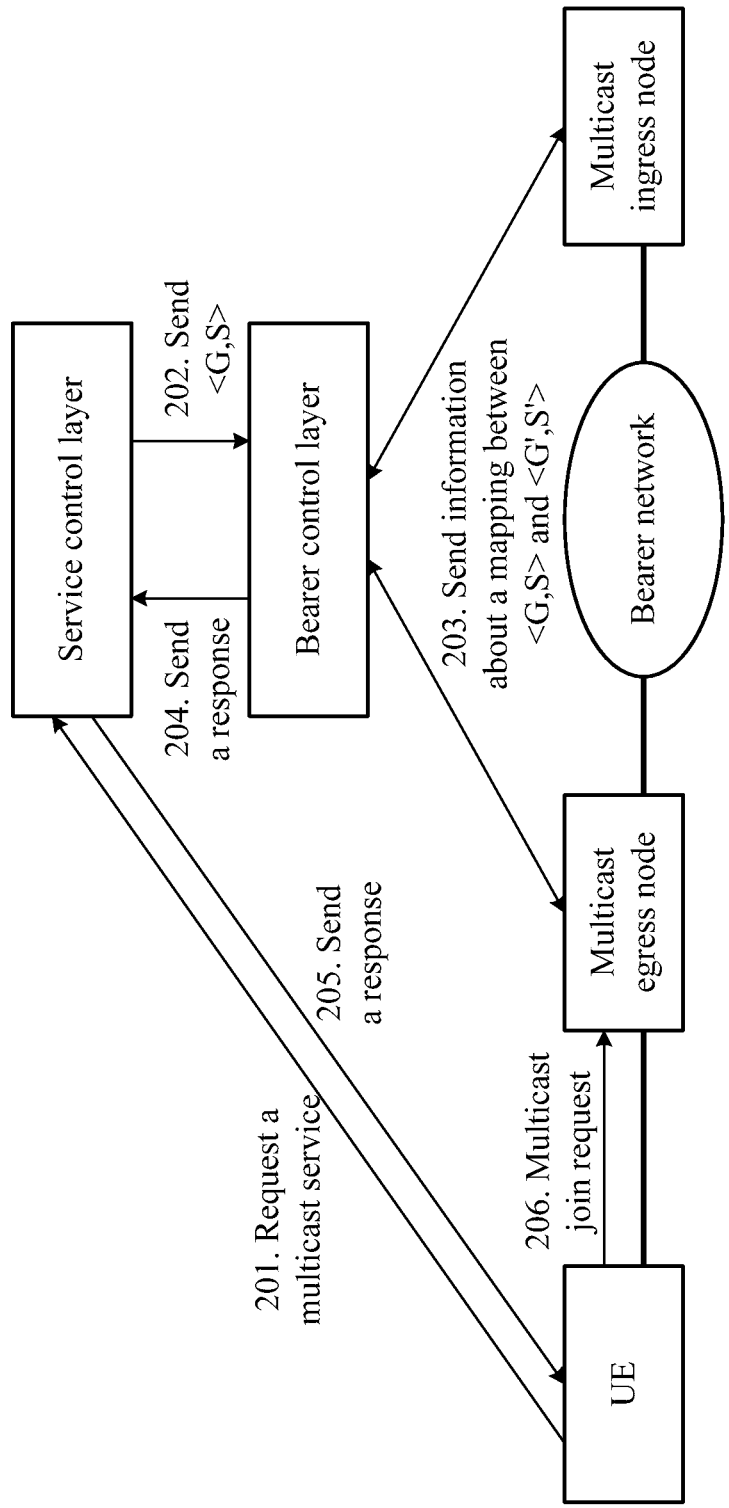
FIG. 2 is a flowchart for controlling multicast addresses in an embodiment of the present invention.

FIG. 2 is a flowchart for controlling multicast addresses in an embodiment of the present invention. In FIG. 2, in a normal service request process, a UE sends multicast address information (such as a multicast address pair <G,S>, where "G" is a multicast address and "S" is a multicast source address) to a Resource and Admission Control Subsystem (RACS) at the bearer control layer through an Application Function (AF); and the RACS maps the multicast address pair to a multicast address pair <G',S'> managed by the RACS, and sends the mapping of the multicast address pair to an ingress node and an egress node of a multicast path of the multicast service. The process includes the following steps:

Step 201: The UE requests a multicast service through high-layer protocol signaling.

Step 202: According to the request, the service control layer obtains the corresponding address ID pair <G,S> of the multicast address, and the multicast address pair is allocated by an IPTV operator. The service control layer sends the multicast address pair <G,S> to the bearer control layer. The bearer control layer controls multicast paths and resources.

Step 203: The RACS at the bearer control layer sets up a multicast path for the multicast service or adds the UE to a multicast path (if the multicast path of the multicast service is available), maps the multicast address pair <G,S> provided by the IPTV operator to a multicast address pair <G',S'> managed by the network operator, and sends information about the mapping between multicast address pairs <G,S> and <G',S'> to an ingress node and an egress node of the multicast path set up for the multicast service. The ingress node and the egress node of the multicast path are located at the edge of the multicast service bearer network. The ingress node receives multicast streams sent by a multicast source. The multicast streams are routed to the egress node along the multicast path. The egress node sends the multicast streams to the UE.

The control function of the RACS at the bearer control layer is as follows: implementing admission control based on a storage policy, and accepting or rejecting a multicast service request. If the RACS accepts a multicast service request from the UE, the RACS reserves resources for transmitting the multicast service data, sets up a multicast path for transmitting the multicast streams, and maps the multicast address pair.

Step 204: The bearer control layer returns a response indicating the setting is complete to the service control layer.

Step 205: The service control layer notifies the UE of success of the multicast service request, and sends the multicast address pair <G,S> of the requested multicast service to the UE.

In the preceding process, in step 203, if the bearer control layer reserves resources for the multicast service requested by the UE, but does not set up a multicast path for the multicast service requested by the UE (or does not add the UE to the multicast path), after the UE receives the notification indicating success of the multicast service request sent by the service control layer in step 205, step 206 needs to be executed. That is, the UE sends a multicast joining request according to the obtained multicast address pair <G,S>, and the request carries the multicast address pair <G,S>. When the request arrives at the egress node of the multicast path, the multicast address pair <G,S> in the multicast joining request is mapped to <G',S'>. The multicast joining request is processed according to a common process.

In addition to a multicast address pair, multicast address information can be identified by a multicast address G. Embodiments of the present invention provide the following mapping modes of multicast addresses:

(1) If multicast address information provided by the IPTV operator is a multicast address pair <G,S>, the multicast address G and the multicast source address S in <G,S> are mapped to a multicast address G' and a multicast source address S' that are managed by the bearer network operator; that is, <G,S> is mapped to <G',S'>.

(2) If multicast address information provided by the IPTV operator is a multicast address pair <G,S>, the multicast address and the multicast source address in <G,S> are mapped to a multicast address that is managed by the bearer network operator; that is, <G,*> is mapped to <G',*>.

(3) If multicast address information provided by the IPTV operator is a multicast address <G>, the multicast address <G> is mapped to a multicast address <G'> that is managed by the bearer network operator; that is, <G> is mapped to <G'>.

(4) If multicast address information provided by the IPTV operator is a multicast address <G>, the multicast address <G> is mapped to a multicast address <G'> that is managed by the bearer network operator, and the multicast service data is allocated an internal multicast source address S' of the bearer network; the multicast address G' and the multicast source address S' form an internal multicast address pair <G',S'> of the bearer network. That is, <G> is mapped to <G',S'>.

The specific implementation of mapping multicast address information provided by the IPTV operator to multicast address information managed by the bearer network operator, setting up a mapping between multicast addresses, and sending the mapping information to an ingress node and an egress node of a multicast path may be based on the multicast service request of a UE, or may be: configuring the mapping information on an ingress node and an egress node of a multicast path in static configuration mode according to the networking conditions or network planning through the RACS or directly.

Figure 3:
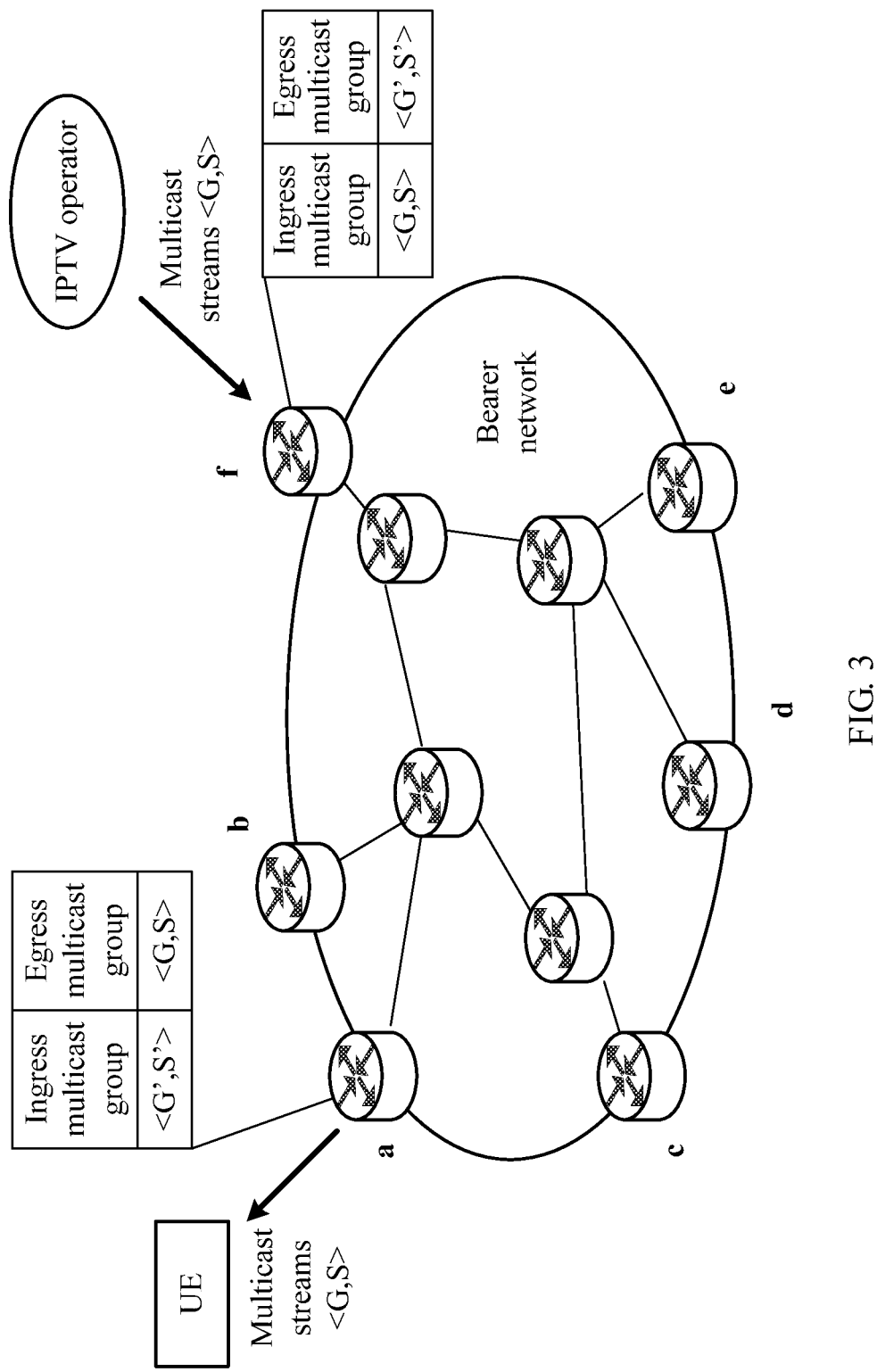
FIG. 3 is a flowchart for transmitting multicast service streams in an embodiment of the present invention.

When multicast streams are transmitted on the multicast service bearer network, the ingress node and the egress node of the multicast service bearer network convert multicast address information according to the mapping of multicast addresses. Thus, the multicast address information allocated by the bearer network operator is used inside the bearer network. FIG. 3 is a flowchart for transmitting multicast service streams.

As shown in FIG. 3, edge nodes of the multicast service bearer network include nodes a-f. The node f is the ingress node of a multicast path and the node a is the egress node of the multicast path. The multicast streams with the multicast address pair <G,S> arrive at the ingress node f from a multicast source, and then enter the bearer network from the ingress node f. The ingress node f converts the multicast address pair <G,S> into <G',S'> according to the multicast address mapping information. The multicast streams with the multicast address pair <G',S'> are routed to the egress node a of the bearer network along the multicast path. The egress node a converts the multicast address pair <G',S'> of the multicast streams into <G,S> according to the multicast address mapping information, and sends the multicast streams to the UE.

As shown in FIG. 3, during specific implementation, the ingress node f maps the ingress multicast group address <G,S> to the egress multicast group address <G',S'> according to the multicast address mapping table sent to it (in the table, the ingress multicast group is <G,S>, and the egress multicast group is <G',S'>). Thus, multicast address information provided by the IPTV operator is converted into internal multicast address information of the bearer network. The egress node a maps the ingress multicast group address <G', S'> into the egress multicast group address <G,S> according to the multicast address mapping table sent to it (in the table, the ingress multicast group is <G',S'>, and the egress multicast group is <G,S>). Thus, internal multicast address information of the bearer network is converted into multicast address information provided by the IPTV operator.

Therefore, for the UE of the recipient of the multicast source and multicast service data, the address information of multicast service data is still provided by the IPTV operator. Multicast service data uses multicast address information provided by the bearer network when it is transmitted inside the bearer network. Therefore, when the network of the IPTV operator needs to be connected to multiple bearer networks, the multicast addresses of the multicast services of the IPTV operator can be consistent. Through address mapping, the addresses of the multicast services do not conflict inside the bearer network. The address information of multicast service data is still provided by the IPTV operator. This facilitates IPTV operators to add services and facilitates menu management.

When multicast addresses correspond to one multicast address pair, multicast services can be implemented according to the foregoing process. When multicast service packages correspond to a group of multicast address pairs, embodiments of the present invention provide a method for implementing multicast services.

The principle of multicast service packages is as follows: Broadcast TV (BTV) programs are classified into different BTV service packages according to the authentication attribute and the charging attribute. When switching channel programs in the same BTV service package, a UE does not need to be authenticated and charged according to each request. Therefore, when the UE requests a multicast service package, the UE needs to request multicast groups corresponding to a group of multicast service streams in the multicast service package. The multicast paths of these multicast service streams are consistent, but multicast addresses are different. If the bearer network maintains multicast paths separately according to multicast addresses, the maintenance burden is very heavy.

Figure 4:
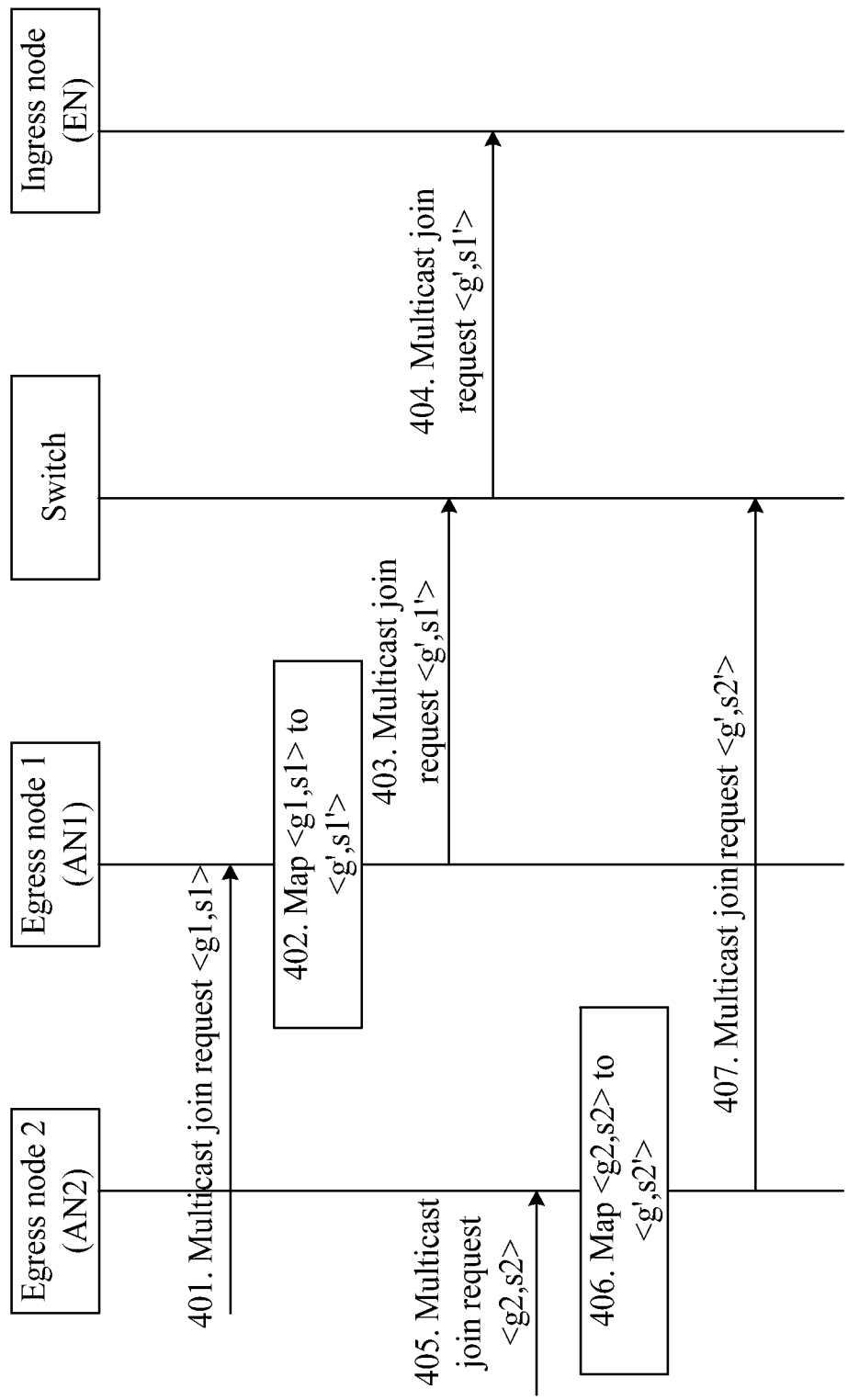
FIG. 4 is a flowchart for implementing multicast service signaling in an embodiment of the present invention.
Figure 5:
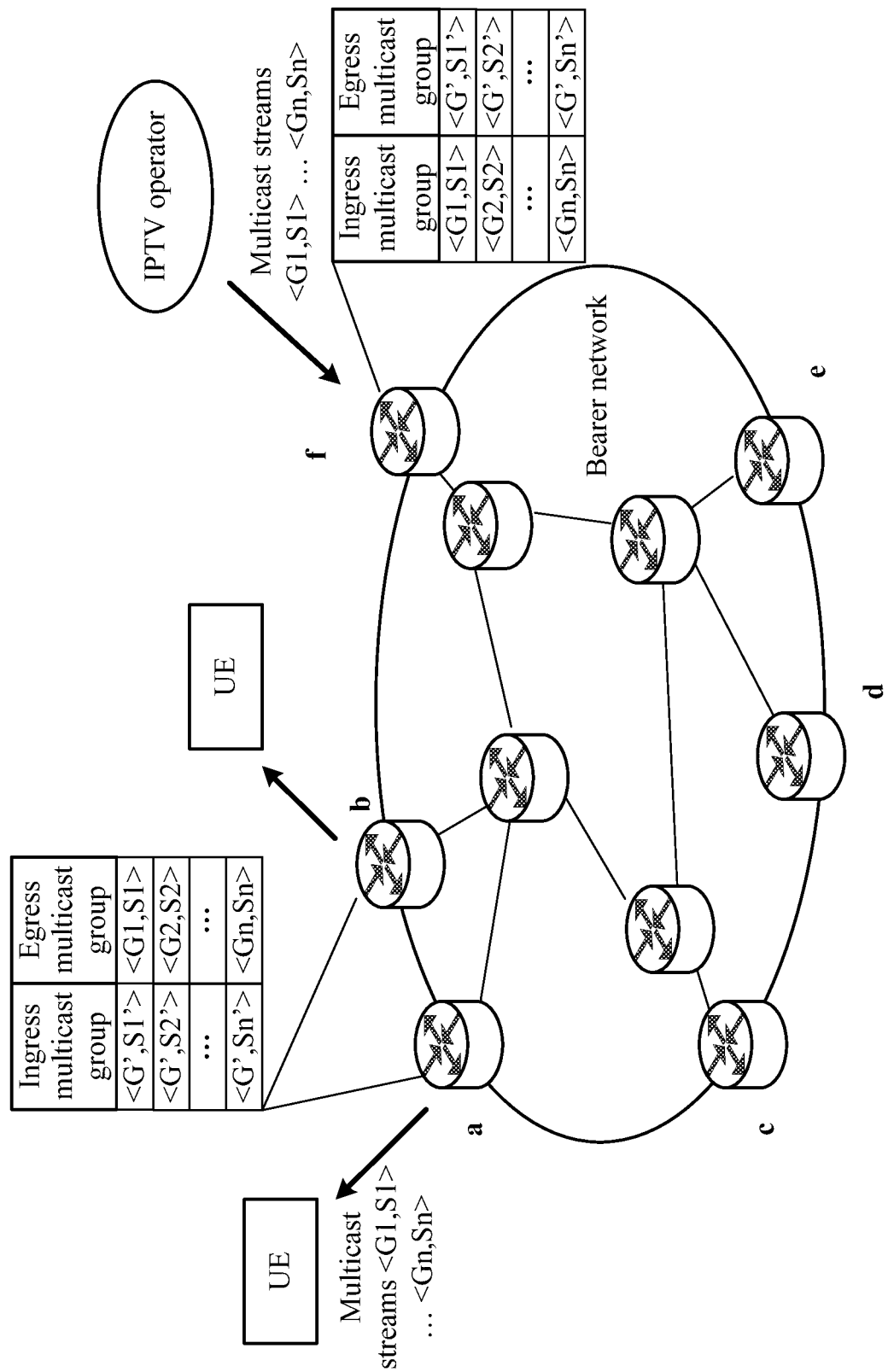
FIG. 5 is a flowchart for transmitting multicast service data streams in an embodiment of the present invention.

According to the preceding case, embodiments of the present invention map the multicast address pairs <G1,S1>, <G2,S2>, <G3,S3>, . . . , and <Gn,Sn> of a group of multicast service streams in the same multicast service package to a group of multicast address pairs <G',S1'>, <G',S2'>, <G', S3'>, . . . , and <G',Sn'> that have the same multicast address according to the networking conditions or network planning. The bearer network maintains only the multicast paths of the multicast service package according to the multicast address G', and uses <G',*> to maintain and allocate resources for the internal multicast paths on the bearer network in a unified manner so that the bearer network can implement simplified control for the group of multicast service streams. FIG. 4 and FIG. 5 provide examples for implementing multicast services with regard to multicast service packages in an embodiment of the present invention.

As shown in FIG. 4, an edge node (EN) provides the ingress of multicast streams for the access convergence network. Located inside the bearer network, the switch can process multicast requests. AN1 and AN2 are two multicast egress nodes. A UE requests a multicast service and the request is accepted. In the process of requesting a multicast service, a multicast address mapping is set up and sent to the corresponding ingress node and egress node. (The specific process is the same as the process shown in FIG. 2). The multicast service requested by the UE is a BTV service package. The BTV service package includes the multicast streams of two multicast address pairs <g1,s1> and <g2,s2>. The address mapping is as follows: <g1,s1> corresponds to the address pair <g',s1'> of the bearer network, and <g2,s2> corresponds to the address pair <g',s2'> of the bearer network. The process of requesting to join a multicast group by the UE includes the following steps:

Step 401: The AN1 receives a multicast joining request sent by the UE, where the request is intended to join multicast streams with the multicast address pair <g1,s1>.

Step 402: According to the multicast address mapping information obtained in advance, the AN1 converts the multicast address pair <g1,s1> into <g',s1'>.

Step 403: The AN1 sends an Internet Group Management Protocol (IGMP) request for joining multicast streams with the multicast address pair <g',s1'>. The request is sent to the switch on the bearer network.

Step 404: The switch sends the IGMP request to the EN at the edge of the network to enable the UE to join multicast streams with the multicast address pair <g',s1'>.

Step 405: The AN2 receives a multicast joining request sent by the UE, where the request is intended to join multicast streams with the multicast address pair <g2,s2>.

Step 406: According to the multicast address mapping information obtained in advance, the AN2 converts the multicast address pair <g2,s2> into <g',s2'>.

Step 407: The AN2 sends an IGMP request for joining multicast streams with the multicast address pair <g',s2'>. The request is sent to the switch on the bearer network. After receiving the request, the switch sets up an entry for multicast replication. The AN1 has requested the multicast streams corresponding to the multicast address <g',*>, and therefore, the multicast request is not sent to the EN.

When multicast streams are transmitted on the multicast service bearer network, the ingress node and the egress node of the multicast service bearer network convert multicast addresses according to the mapping of multicast address pairs. Thus, the multicast addresses allocated by the bearer network operator are used inside the bearer network. FIG. 5 is a flowchart for transmitting multicast service streams.

As shown in FIG. 5, edge nodes of the multicast service bearer network include nodes a-f. The node f is the ingress node (corresponding to the EN in FIG. 4) of a multicast path and the nodes a and b are the egress nodes (corresponding to the AN1 and AN2 in FIG. 4) of the multicast path. A group of multicast streams in a multicast service package, which correspond to a group of multicast address pairs <G1,S1>, <G2,S2>, <G3,S3>, . . . , and <Gn,Sn> (The multicast address pairs are provided by the IPTV operator), arrive at the ingress node f from the multicast source, and then enter the bearer network from the ingress node f. According to the multicast address mapping information, the ingress node f converts the multicast address pairs (<G1,S1>, <G2,S2>, <G3,S3>, . . . , and <Gn,Sn>) of the group of multicast streams into internal multicast address pairs (<G',S1'>, <G',S2'>, <G',S3'>, . . . , and <G',Sn'>) of the bearer network. The multicast streams with the group of multicast address pairs <G',S1'>, <G',S2'>, <G',S3'>, . . . , and <G',Sn'> are routed to the egress nodes a and b of the bearer network along the multicast path. The egress nodes a and b convert the internal multicast address pairs <G',S1'>, <G',S2'>, <G',S3'>, . . . , and <G',Sn'> of the bearer network of the group of multicast streams into multicast address pairs <G1,S1>, <G2,S2>, <G3,S3>, . . . , and <Gn,Sn> provided by the IPTV operator, and send the group of multicast streams to the UE.

As shown in FIG. 5, during specific implementation, the ingress node f maps the ingress multicast group address to the corresponding egress multicast group address according to the multicast address mapping table sent to it (in the table, the ingress multicast group is <G1,S1>, <G2,S2>, <G3,S3>, . . . , and <Gn,Sn>, and the egress multicast group is <G',S1'>, <G',S2'>, <G',S3'>, . . . , and <G',Sn'>). Thus, multicast address information provided by the IPTV operator is converted into internal multicast address information of the bearer network. The egress nodes a and b map the ingress multicast group address to the corresponding egress multicast group address according to the multicast address mapping table sent to it (in the table, the ingress multicast group is <G',S1'>, <G',S2'>, <G',S3'>, . . . , and <G',Sn'>, and the egress multicast group is <G1,S1>, <G2,S2>, <G3,S3>, . . . , and <Gn,Sn>). Thus, internal multicast address information of the bearer network is converted into multicast address information provided by the IPTV operator.

In the preceding process, when one multicast service package corresponds to multiple multicast streams of the same multicast path, multicast address pairs of different multicast streams that have the same multicast path are converted into multicast address pairs that have the same multicast address (multicast groups are differentiated according to the address of a multicast source). Thus, the bearer network may maintain only a multicast path corresponding to the multicast address, and the number of multicast paths to be maintained is reduced. In an actual application, multicast addresses of multicast streams in different multicast paths can be mapped to the same multicast address to reduce the number of multicast paths to be maintained.

Figure 6:
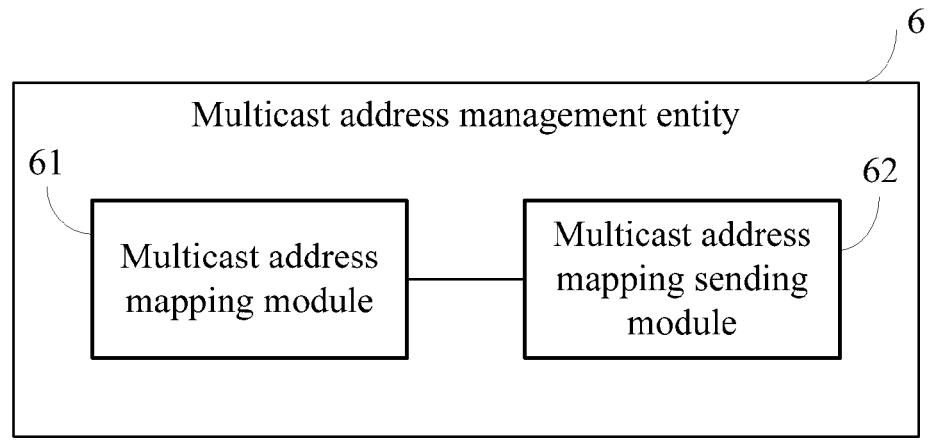
FIG. 6 shows a structure of a resource management system in an embodiment of the present invention.

Embodiments of the present invention further provide a resource management system. FIG. 6 shows a structure of a resource management system in an embodiment of the present invention. The resource management system includes a multicast address management entity 6. The multicast address management entity 6 includes a multicast address mapping module 61 and a multicast address mapping sending module 62.

The multicast address mapping module 61 is adapted to: map an original multicast address ID of multicast service data (namely, multicast address information provided by the IPTV operator) to a multicast address ID inside the bearer network, and set up a mapping between the original multicast address ID of the multicast service data and the multicast address ID inside the bearer network. The original multicast address ID is provided by the IPTV operator. The multicast address ID inside the bearer network is allocated by the operator of the multicast service bearer network.

The multicast address mapping sending module 62 is adapted to send the mapping between the original multicast address ID and the multicast address ID inside the bearer network to an ingress node device and an egress node device of a multicast path. Thus, the ingress node device and the egress node device can convert multicast address IDs of multicast service data according to the mapping.

The specific processing of the multicast address mapping module 61 is as follows:

if the original multicast address ID is a multicast address, the multicast address mapping module 61 maps the original multicast address to an internal multicast address of the bearer network; or maps the original multicast address to an internal multicast address of the bearer network, allocates an internal multicast source address of the bearer network, and combines the mapped multicast address and the allocated multicast source address into an internal multicast address pair of the bearer network; and if the original multicast address ID is a multicast address pair, the multicast address mapping module 61 maps the multicast address in the original multicast address pair to an internal multicast address of the bearer network; or maps the multicast address and the multicast source address in the original multicast address pair to the multicast address and the multicast source address in an internal multicast address pair of the bearer network.

The multicast address mapping module 61 may further map original multicast address pairs of multiple multicast service data to internal multicast address pairs of the bearer network. If multicast addresses in the internal multicast address pairs of the bearer network are the same, and especially, if a group of multicast service streams in a multicast service package have the same multicast path, the multicast address mapping module may map multicast address pairs of the multicast service streams to internal multicast address pairs that have the same multicast address, of the bearer network.

The multicast address management entity may be located in a RACS, or located in a router (especially, a central router), a resource manager, a policy manager, and a broadband access server when serving as a functional module.

Figure 7:
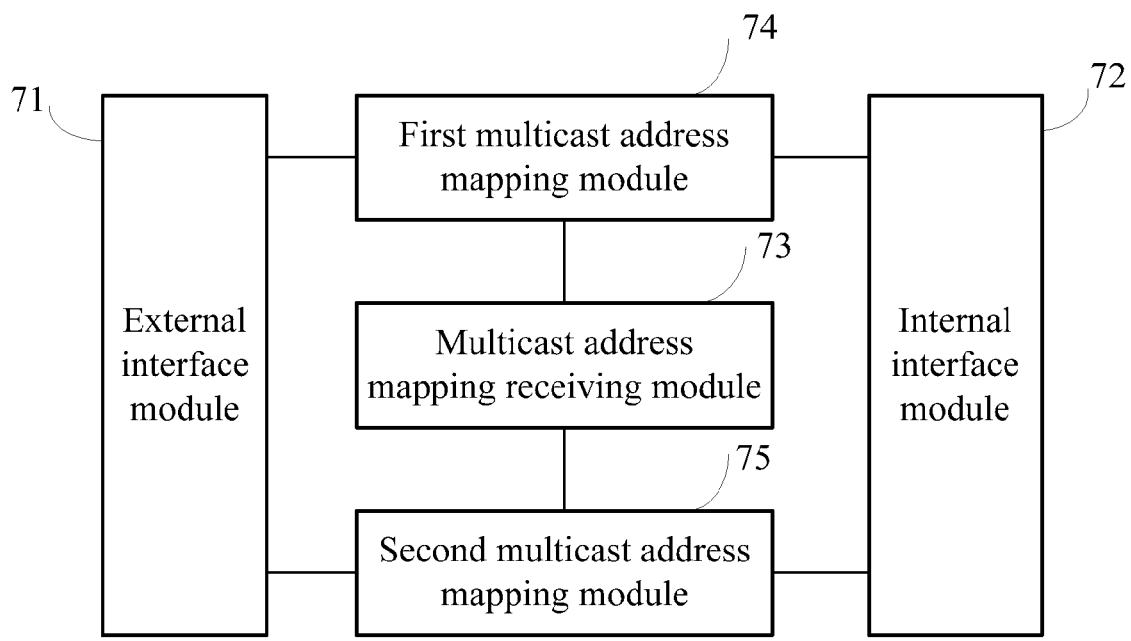
FIG. 7 shows a structure of a data transmission device in an embodiment of the present invention.

Embodiments of the present invention further provide a data transmission device. FIG. 7 shows a structure of a data transmission device in an embodiment of the present invention. The data transmission device includes an external interface module 71 and an internal interface module 72. The data transmission device further includes a multicast address mapping receiving module 73 and a first multicast address mapping module 74.

The external interface module 71 and the internal interface module 72 are adapted to exchange multicast service data with an external device and an internal device on the bearer network respectively. The multicast service data may be multicast streams or related signaling.

The multicast address mapping receiving module 73 is adapted to receive a mapping of multicast addresses. The mapping information includes a mapping between an original multicast address ID of multicast service data and a multicast address ID inside the bearer network. The original multicast address ID is provided by the IPTV operator and the multicast address ID inside the bearer network is allocated by the operator of the multicast service bearer network.

The first multicast address mapping module 74 is adapted to: convert the original multicast address ID of multicast service data into the multicast address ID inside the bearer network according to the mapping information, and send the multicast service data to the internal interface module; or convert the multicast address ID inside the bearer network into the original multicast address ID of the multicast service data, and send the multicast service data to the external interface module.

When the data transmission device is located at the ingress of a multicast path, the mapping information received by the multicast address mapping receiving module 73 indicates mapping the original multicast address ID to the multicast address ID inside the bearer network; and the first multicast address mapping module 74 maps/converts the original multicast address ID of multicast streams received by the external interface module 71 from the multicast source into the multicast address ID inside the bearer network according to the mapping information and sends the multicast streams to the internal interface module 72, and the internal interface module 72 sends the multicast streams to another data transmission device on the bearer network.

When the data transmission device is located at the egress of a multicast path, the mapping information received by the multicast address mapping receiving module 73 indicates mapping the multicast address ID inside the bearer network to the original multicast address ID; and the first multicast address mapping module 74 maps/converts the multicast address ID inside the bearer network of multicast streams received by the internal interface module 72 into the original multicast address ID of the multicast streams according to the mapping information and sends the multicast streams to the external interface module 71, and the external interface module 71 sends the multicast streams to the recipient.

The data transmission device may further include a second multicast address mapping module 75.

When the data transmission device is located at the egress of a multicast path, according to the mapping information, the second multicast address mapping module 75 maps/converts the original multicast address ID in multicast service signaling (such as a multicast joining request) received by the external interface module 71 into the multicast address ID inside the bearer network and sends the signaling to the internal interface module 72, and the internal interface module 72 sends the signaling to a data transmission device on the bearer network.

When the data transmission device is located at the ingress of a multicast path, according to the mapping information, the second multicast address mapping module 75 maps the multicast address ID inside the bearer network in multicast service signaling (such as a multicast joining request) received by the internal interface module 72 to the original multicast address ID of the multicast service and sends the signaling to the external interface module 71.

Embodiments of the present invention further provide a system for implementing multicast services. The system includes a multicast address management entity and data transmission devices at the ingress and the egress of a multicast path.

The multicast address management entity is adapted to: set up a mapping between an original multicast address ID of multicast service data and a multicast address ID inside the bearer network; and send the mapping information to data transmission devices at the ingress and the egress of the multicast path. The original multicast address ID is provided by the IPTV operator and the multicast address ID inside the bearer network is allocated by the operator of the multicast service bearer network.

The data transmission device located at the ingress of the multicast path is adapted to: map/convert the original multicast address of multicast service data received from the multicast source into the multicast address ID inside the bearer network according to the mapping of multicast addresses, and send the multicast service data to the data transmission device at the egress of the multicast path.

The data transmission device located at the egress of the multicast path is adapted to: map/convert the multicast address ID inside the bearer network of multicast service data into the original multicast address ID of the multicast service data, and send the multicast service data to the recipient.

To sum up, in embodiments of the present invention, the control and data processes of the UE and the IPTV operator do not change. The bearer control layer and the bearer layer convert multicast addresses in control and data streams. Externally, the multicast addresses do not change, and internally, the multicast addresses are converted into internal multicast addresses. Therefore, multicast addresses do not conflict inside the bearer network. In the address conversion process, different multicast groups that have the same multicast path can be converted into multicast groups that have the same multicast address (multicast groups are differentiated through the address of a multicast source). Thus, the bearer network may maintain only a multicast path corresponding to the multicast address, and the number of multicast paths to be maintained is reduced.

According to the foregoing embodiments, those skilled in the art are clearly aware that the present invention may be implemented through hardware or through software in addition to a necessary universal hardware platform. Thus, the technical solution of the present invention may be made into software. The software may be stored in a non-volatile storage medium (for example, a CD-ROM, a USB disk, and a mobile hard disk), and include several instructions that instruct a computer device (such as a personal computer, a server, or a network device) to perform the methods provided in each embodiment of the present invention.

Although the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the claims or their equivalents.

What is claimed is:

1. A method for implementing multicast services, comprising:
    setting up, by a Resource and Admission Control Subsystem (RACS) at bearer control layer, a mapping relationship information between an original multicast address ID of multicast service data and a multicast address ID inside a bearer network;
    sending, by the RACS, the mapping relationship information to an ingress node and an egress node of a multicast path;
    converting, by the ingress node, the address of the received multicast service data from the original multicast address ID into the multicast address ID inside the bearer network according to the mapping relationship information and sending out the multicast service data; and
    converting, by the egress node, the address of the received multicast service data from the multicast address ID inside the bearer network into the original multicast address ID according to the mapping information and sending out the multicast service data;
    wherein the step of setting up the mapping relationship information between the original multicast address ID of multicast service data and the multicast address ID inside the bearer network comprises:
    mapping the multicast address pairs to multicast address pairs inside the bearer network when multiple multicast address pairs correspond to a same multicast service package; and
    wherein multicast addresses in the internal multicast address pairs of the bearer network are the same.

2. A multicast address management entity, comprising:
    a multicast address mapping module configured to set up a mapping relationship information between an original multicast address ID of multicast service data and a multicast address ID inside a bearer network; and
    a multicast address mapping sending module, configured to send the mapping relationship information between the original multicast address ID and the multicast address ID inside the bearer network to an ingress node device and an egress node device of a multicast path, so that the ingress node device and the egress node device can convert multicast address IDs of the multicast service data according to the mapping relationship information;
    wherein the multicast address mapping module is further configured to map original multicast address pairs of multiple multicast service data to multicast address pairs inside the bearer network when multiple multicast address pairs correspond to a same multicast service package, and multicast addresses in the multicast address pairs inside the bearer network are the same.

3. A method for implementing multicast services, comprising:
    setting up, by a Resource and Admission Control Subsystem (RACS) at bearer control layer, a mapping relationship information between an original multicast address ID of multicast service data and a multicast address ID inside a bearer network;
    sending, by the RACS, the mapping relationship information to an ingress node and an egress node of a multicast path;
    converting, by the ingress node, the address of the received multicast service data from the original multicast address ID into the multicast address ID inside the bearer network according to the mapping relationship information and sending out the multicast service data; and
    converting, by the egress node, the address of the received multicast service data from the multicast address ID inside the bearer network into the original multicast address ID according to the mapping information and sending out the multicast service data;
    wherein the setting up step specifically comprises:
    setting up, by the Resource and Admission Control Subsystem (RACS) at bearer control layer, a mapping relationship information between an original multicast address ID of multicast service data and a multicast address ID inside a bearer network after receiving the original multicast address ID from an Application Function (AF) of service control layer.

4. A multicast address management entity, comprising:
    a multicast address mapping module configured to set up a mapping relationship information between an original multicast address ID of multicast service data and a multicast address ID inside a bearer network; and
    a multicast address mapping sending module, configured to send the mapping relationship information between the original multicast address ID and the multicast address ID inside the bearer network to an ingress node device and an egress node device of a multicast path, so that the ingress node device and the egress node device can convert multicast address IDs of the multicast service data according to the mapping relationship information;

wherein the multicast address mapping module is specifically configured to set up the mapping relationship information between an original multicast address ID of multicast service data and a multicast address ID inside a bearer network after receiving the original multicast address ID from an Application Function (AF) of service control layer.

* * * * *